United States Patent
Nguyen et al.

(10) Patent No.: US 10,738,581 B2
(45) Date of Patent: Aug. 11, 2020

(54) FRACTURING TREATMENTS IN SUBTERRANEAN FORMATIONS USING ELECTRICALLY CONTROLLED PROPELLANTS

(71) Applicant: Halliburton Energy Services, Inc., Houston, TX (US)

(72) Inventors: Philip D. Nguyen, Houston, TX (US); Ronald Glen Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/472,782

(22) PCT Filed: Jan. 23, 2017

(86) PCT No.: PCT/US2017/014547
§ 371 (c)(1),
(2) Date: Jun. 21, 2019

(87) PCT Pub. No.: WO2018/136095
PCT Pub. Date: Jul. 26, 2018

(65) Prior Publication Data
US 2019/0368328 A1 Dec. 5, 2019

(51) Int. Cl.
*E21B 43/263* (2006.01)
*E21B 43/24* (2006.01)
(Continued)

(52) U.S. Cl.
CPC ............ *E21B 43/263* (2013.01); *C09K 8/665* (2013.01); *E21B 43/2405* (2013.01);
(Continued)

(58) Field of Classification Search
None
See application file for complete search history.

(56) References Cited

U.S. PATENT DOCUMENTS

| 3,842,910 A | 10/1974 | Zingg et al. |
| 4,448,926 A | 5/1984 | Lundberg et al. |

(Continued)

FOREIGN PATENT DOCUMENTS

| WO | 2010/039290 A1 | 4/2010 |
| WO | 2011/115723 A1 | 9/2011 |

(Continued)

OTHER PUBLICATIONS

International Search Report and Written Opinion issued in related PCT Application No. PCT/US2017/014547 dated Oct. 18, 2017, 19 pages.

(Continued)

*Primary Examiner* — Andrew Sue-Ako
(74) *Attorney, Agent, or Firm* — Thomas Rooney; Baker Botts L.L.P.

(57) ABSTRACT

Systems and methods for forming and/or enhancing fractures in a subterranean formation using electrically controlled propellant materials are provided. In some embodiments, the methods comprise: introducing a treatment fluid comprising an electrically controlled propellant and a plurality of electrically conductive particles in at least one primary fracture in a portion of a subterranean formation; placing the plurality of electrically conductive particles in at least the primary fracture; placing the electrically controlled propellant in one or more areas of the subterranean formation proximate to the primary fracture; and applying an electrical current to at least a portion of the electrically controlled propellant to ignite the portion of the electrically controlled propellant in the one or more areas of the subterranean formation proximate to the primary fracture to form one or more secondary or tertiary fractures in the subterranean formation.

20 Claims, 4 Drawing Sheets

(51) Int. Cl.
*E21B 43/26* (2006.01)
*C09K 8/66* (2006.01)
*E21B 43/267* (2006.01)
*C09K 8/68* (2006.01)

(52) U.S. Cl.
CPC .............. *E21B 43/26* (2013.01); *C09K 8/685* (2013.01); *E21B 43/267* (2013.01)

(56) References Cited

U.S. PATENT DOCUMENTS

| | | |
|---|---|---|
| 4,530,396 A | 7/1985 | Mohaupt |
| 4,662,451 A | 5/1987 | Boade |
| 4,780,221 A | 10/1988 | Holtmyer et al. |
| 4,798,244 A | 1/1989 | Trost |
| 5,295,545 A | 3/1994 | Passamaneck |
| 5,346,015 A | 9/1994 | Grundmann |
| 5,831,203 A * | 11/1998 | Ewick ...................... F42B 3/13 102/202.5 |
| 6,098,516 A | 8/2000 | Gazonas |
| 6,169,134 B1 | 1/2001 | Jones et al. |
| 6,938,692 B2 | 9/2005 | Nguyen et al. |
| 7,032,663 B2 | 4/2006 | Nguyen |
| 7,040,405 B2 | 5/2006 | Nguyen et al. |
| 7,044,224 B2 | 5/2006 | Nguyen |
| 7,052,543 B2 | 5/2006 | Nguyen et al. |
| 7,073,581 B2 | 7/2006 | Nguyen et al. |
| 7,172,022 B2 | 2/2007 | Reddy et al. |
| 7,216,708 B1 | 5/2007 | Bond et al. |
| 7,331,385 B2 | 2/2008 | Symington et al. |
| 7,431,075 B2 | 10/2008 | Brooks et al. |
| 7,631,691 B2 | 12/2009 | Symington et al. |
| 7,730,951 B2 | 6/2010 | Surjaatmadja et al. |
| 7,794,537 B2 | 9/2010 | Barlet-Gouedard et al. |
| 8,317,952 B2 | 11/2012 | Katzakian et al. |
| 8,607,704 B2 | 12/2013 | Stark et al. |
| 8,617,327 B1 | 12/2013 | Katzakian et al. |
| 8,689,876 B2 | 4/2014 | Loree et al. |
| 8,888,935 B2 | 11/2014 | Grix et al. |
| 8,931,553 B2 | 1/2015 | Cannan et al. |
| 9,027,641 B2 | 5/2015 | Alekseenko et al. |
| 9,057,261 B2 | 6/2015 | Walters et al. |
| 9,080,441 B2 | 7/2015 | Meurer et al. |
| 9,182,207 B2 | 11/2015 | McPherson et al. |
| 9,243,182 B2 | 1/2016 | Lanctot-Downs et al. |
| 9,328,034 B2 | 5/2016 | McPherson et al. |
| 2005/0205258 A1 | 9/2005 | Reddy et al. |
| 2006/0011276 A1 | 1/2006 | Grix et al. |
| 2006/0065400 A1 | 3/2006 | Smith |
| 2006/0185898 A1 | 8/2006 | Seekford |
| 2009/0305914 A1 | 12/2009 | Li et al. |
| 2011/0067789 A1 | 3/2011 | Grix et al. |
| 2012/0037368 A1 | 2/2012 | Eick et al. |
| 2012/0328377 A1 | 12/2012 | Brenneis et al. |
| 2013/0327529 A1 | 12/2013 | Sprouse |
| 2013/0341029 A1 | 12/2013 | Roberts et al. |
| 2014/0138090 A1 | 5/2014 | Hill et al. |
| 2014/0144633 A1 | 5/2014 | Nguyen et al. |
| 2014/0144635 A1 | 5/2014 | Nguyen et al. |
| 2014/0190686 A1 * | 7/2014 | Cannan ............... E21B 47/0905 166/250.01 |
| 2014/0251623 A1 | 9/2014 | Lestz et al. |
| 2014/0318786 A1 | 10/2014 | Vidma et al. |
| 2015/0021023 A1 | 1/2015 | Roberts et al. |
| 2015/0060065 A1 | 3/2015 | Scharmach et al. |
| 2016/0003022 A1 | 1/2016 | Rothrock et al. |
| 2016/0153271 A1 | 6/2016 | Mace et al. |
| 2016/0153274 A1 | 6/2016 | Hull et al. |
| 2016/0186046 A1 | 6/2016 | Barreto |
| 2016/0186501 A1 | 6/2016 | Livescu et al. |
| 2016/0245061 A1 | 8/2016 | Nguyen et al. |
| 2017/0016703 A1 | 1/2017 | Mace et al. |
| 2019/0368327 A1 * | 12/2019 | Nguyen ................ E21B 33/138 |

FOREIGN PATENT DOCUMENTS

| | | |
|---|---|---|
| WO | 2015/030908 A2 | 3/2015 |
| WO | 2015/126365 A1 | 8/2015 |
| WO | 2015/126408 A1 | 8/2015 |
| WO | 2016/036343 A1 | 3/2016 |
| WO | 2018/136093 A1 | 7/2018 |
| WO | 2018/136100 A1 | 7/2018 |

OTHER PUBLICATIONS

International Search Report and Written Opinion issued in related PCT Application No. PCT/US2017/014518 dated Oct. 23, 2017, 9 pages.
International Search Report and Written Opinion issued in related PCT Application No. PCT/US2017/014574 dated Oct. 24, 2017, 17 pages.

* cited by examiner

FRACTURING TREATMENTS IN SUBTERRANEAN FORMATIONS USING ELECTRICALLY CONTROLLED PROPELLANTS

CROSS-REFERENCE TO RELATED APPLICATION

The present application is a U.S. National Stage Application of International Application No. PCT/US2017/014547 filed Jan. 23, 2017, which is incorporated herein by reference in its entirety for all purposes.

BACKGROUND

The present disclosure relates to systems and methods for fracturing in subterranean formations.

Wells in hydrocarbon-bearing subterranean formations are often stimulated to produce those hydrocarbons using hydraulic fracturing treatments. In hydraulic fracturing treatments, a viscous fracturing fluid, which also functions as a carrier fluid, is pumped into a producing zone at a sufficiently high rate and/or pressure such that one or more fractures are formed in the zone. These fractures provide conductive channels through which fluids in the formation such as oil and gas may flow to a well bore for production. In order to maintain sufficient conductivity through the fracture, it is often desirable that the formation surfaces within the fracture or "fracture faces" be able to resist erosion and/or migration to prevent the fracture from narrowing or fully closing. Typically, proppant particulates suspended in a portion of the fracturing fluid are also deposited in the fractures when the fracturing fluid is converted to a thin fluid to be returned to the surface. These proppant particulates serve to prevent the fractures from fully closing so that conductive channels are formed through which produced hydrocarbons can flow.

In many conventional fracturing treatments, large amounts of water or other fluids (e.g., an average of 1 million gallons per fracturing stage) are typically pumped at high rates and pressures in order provide sufficient energy downhole to form fractures in the formation of the desired geometries. Large amounts of proppant are also often used in these operations; however, those proppants must be sized carefully to prevent premature screenout during their placement into the fractures and efficiently prop open fractures in the well system, and the fluids carrying those proppants must have sufficient viscosity to carry those proppants to their desired locations. Providing the large amounts of pumping power, water, and proppants for these operations, and the disposal of water flowing back out of the formation after these treatments, are often costly and time-consuming, and make fracturing operations economically impractical in many circumstances.

BRIEF DESCRIPTION OF THE DRAWINGS

These drawings illustrate certain aspects of some of the embodiments of the present disclosure, and should not be used to limit or define the claims.

Figure 1:
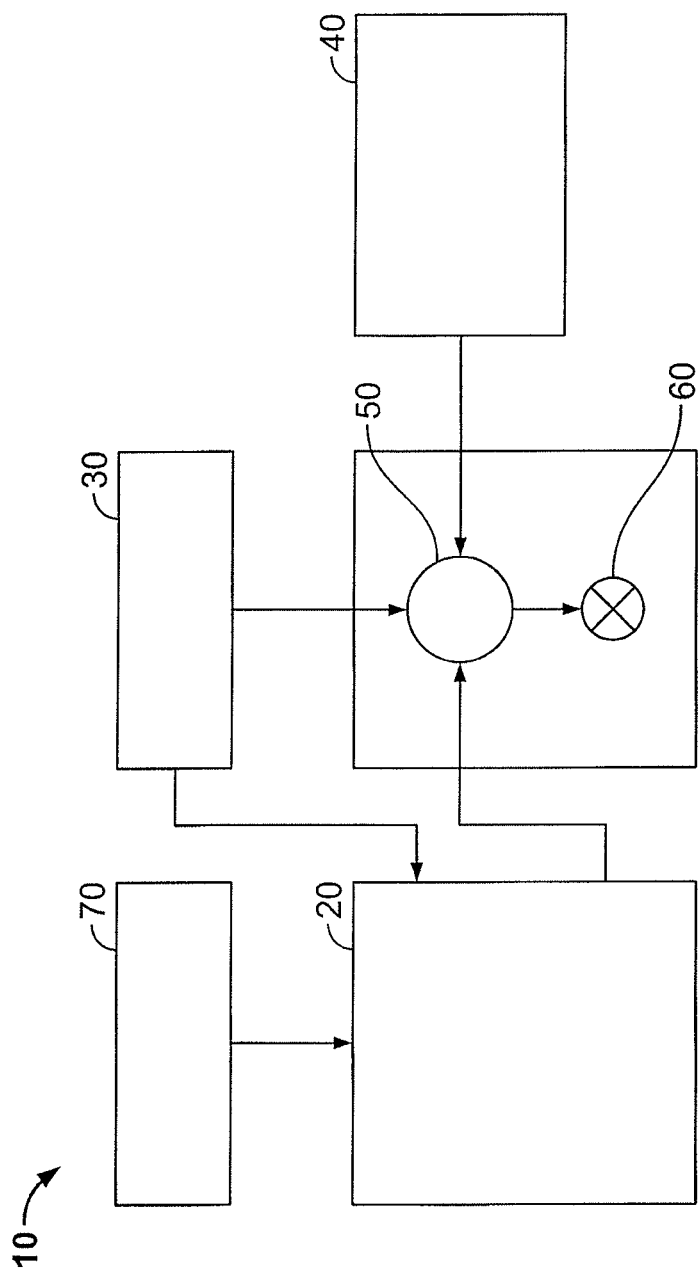
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for fracturing treatments in subterranean formations. More particularly, the present disclosure relates to systems and methods for forming and/or enhancing fractures in a subterranean formation using electrically controlled propellant materials.

The present disclosure provides methods and systems using electrically controlled propellant as a source of energy for creating or enhancing fractures and fracture geometries in a subterranean formation. In accordance with the methods of the present disclosure, a primary fracture is provided, created, or enhanced in at least a portion of a subterranean formation, typically by introducing a fracturing fluid or pad fluid at a pressure sufficient to create the primary fracture. In certain methods of the present disclosure, the primary fracture may be a preexisting fracture in the formation (e.g., a fracture formed in a prior hydraulic fracturing treatment), or may be newly generated during a method of the present disclosure. An electrically controlled propellant is introduced into the primary fracture (or is provided in a fluid that is introduced at sufficient pressure to create the primary fracture) and allowed to penetrate one or more areas of the subterranean formation proximate to the primary fracture, such as bedding planes or spaces between layers in a shale formation along the primary fracture or secondary fractures in that area of the formation. The electrically controlled propellant may be provided as a component of the same fracturing fluid used to create or enhance the primary fracture, or may be provided in a separate fluid introduced into the primary fracture. Once the electrically controlled propellant is in place in the formation, pumping and/or injection of fluid into the well may be ceased and an electrical current may be applied to at least a portion of the propellant to ignite it. A plurality of electrically conductive particles may be placed into the primary fracture to facilitate transmission of the electrical current to the propellant. The combustion of the electrically controlled propellant may rupture areas of the formation proximate to the primary fracture, forming secondary or tertiary fractures (e.g., cracks or fissures) therein. These secondary or tertiary fractures may enhance the connective surface areas in the rock formation, which may stimulate the production of hydrocarbons therefrom and/or increase the fluid permeability of those regions of the formation.

Among the many potential advantages to the methods and compositions of the present disclosure, only some of which are alluded to herein, the methods, compositions, and systems of the present disclosure may help optimize fracturing treatments in a number of ways. For example, in some embodiments, the methods of the present disclosure may minimize or eliminate the use of large volumes of fluids (e.g., water) and/or sand used in conventional fracturing treatments, and/or reduce the amount of pumping horsepower required to create complex fracturing geometries in subterranean formations. Reducing pumping horsepower can, among other benefits, significantly lower fuel usage and atmospheric emissions during pumping operations. Reducing the amount of water used in fracturing operations may, among other benefits, reduce flowback volume and/or costs of disposing flowback water. Reducing or eliminating the amount of fracturing sand or other proppants used in fracturing operations may, among other benefits, simplify the composition of fracturing fluids that no longer need to suspend proppant particulates, reduce proppant settling issues, and/or may decrease the abrasion to well site equipment from pumping proppant slurries into the formation. In certain embodiments, the ignition of the electrically controlled propellants used in the methods and systems of the present disclosure may be more effectively controlled as compared to other types of explosives or downhole energy sources. For example, these electrically controlled propellants may be less likely to spontaneously ignite, particularly at elevated pressure and/or temperature conditions experienced downhole. For these and other reasons, the methods and systems of the present disclosure may present fewer or smaller safety risks in their transportation, handling, and use than other methods and systems using other energy sources. Moreover, in some embodiments, it may be possible to cease the ignition of an electrically controlled propellant (e.g., by discontinuing the flow of electrical current therethrough), and then re-ignite the remaining portion of propellant at a subsequent time by re-applying electrical current to that same area. Consequently, in some embodiments, the methods and systems of the present disclosure may provide ways of fracturing or otherwise stimulating subterranean formations that can be used or actuated repeatedly without repeated interventions in the same well or placement of additional treatment fluids therein.

The electrically controlled propellants of the present disclosure may comprise any substance known in the art that can be ignited by passing an electrical current through the propellant. The electrically controlled propellant may be provided as a liquid, or as a solid or semi-solid (e.g., powders, pellets, etc.) dissolved, dispersed, or suspended in a carrier liquid. In some embodiments, a liquid form may be particularly suited to penetrating smaller cracks, microfractures, and/or bedding planes in a formation, among other reasons, to more effectively place the electrically controlled propellant in those areas. In some embodiments, electrically-controlled propellants provided in solid form may be used in lieu of or in combination with other proppant materials to prop open small cracks, fractures, or bedding planes in the formation (e.g., in the far well bore region of the formation) when the fracturing fluid pressure is released. In some embodiments, the electrically controlled propellant may be provided in a composition that comprises a mixture of one or more electrically controlled propellants and other materials, including but not limited to inert materials such as sand, cement, fiberglass, ceramic materials, carbon fibers, polymeric materials, sand, clay, acid soluble materials, degradable materials (e.g., polylactic acid), and the like. In certain embodiments, the electrically controlled propellant may comprise a binder (e.g., polyvinyl alcohol, polyvinylamine nitrate, polyethanolaminobutyne nitrate, polyethyleneimine nitrate, copolymers thereof, and mixtures thereof), an oxidizer (e.g., ammonium nitrate, hydroxylamine nitrate, and mixtures thereof), and a crosslinking agent (e.g., boric acid). Such propellant compositions may further comprise additional optional additives, including but not limited to stability enhancing or combustion modifying agents (e.g., 5-aminotetrazole or a metal complex thereof), dipyridyl complexing agents, polyethylene glycol polymers, and the like. In certain embodiments, the electrically controlled propellant may comprise a polyalkylammonium binder, an oxidizer, and an eutectic material that maintains the oxidizer in a liquid form at the process temperature (e.g., energetic materials such as ethanolamine nitrate (ETAN), ethylene diamine dinitrate (EDDN), or other alkylamines or alkoxylamine nitrates, or mixtures thereof). Such propellants may further comprise a mobile phase comprising at least one ionic liquid (e.g., an organic liquid such as N,n-butylpyridinium nitrate). Certain of the aforementioned propellants may be commercially available from Digital Solid State Propulsion, Inc. of Reno, Nev.

The electrically controlled propellants may be provided and/or placed in the subterranean formation in any amount sufficient to provide the amount of energy required to create or enlarge the desired fracture geometries in the formation when ignited. In some embodiments, the amount of energy needed to create or enlarge the desired connective stimulated reservoir volumes may be approximated as a function of the equivalent amount of energy created by pumping a fluid into the formation at a specific injection rate and hydraulic horsepower that creates the bottomhole treating pressure required in conventional hydraulic fracturing treatments. Using the heat of combustion of the electrically controlled propellant, the amount of propellant needed to create that amount of energy may be calculated. The data from an example of these calculations at various bottomhole treating pressures (BHTP) using ammonium nitrate as the propellant (heat of combustion=1,500 kJ/kg or 682 kJ/lb) is shown in Table 1.

TABLE 1

| BHTP (psi) | Injection Rate (bpm) | Pump time (min) | HHP | Downhole Energy (KW-hour) | Downhole Energy (kJ) | Equivalent Weight of Ammonimum Nitrate (lbs) |
|---|---|---|---|---|---|---|
| 5,000 | 80 | 60 | 9,800 | 7,308 | 26,308,296 | 38,656 |
| 6,000 | 80 | 60 | 11,760 | 8,769 | 31,569,955 | 46,387 |
| 7,000 | 80 | 60 | 13,720 | 10,231 | 36,831,614 | 54,118 |
| 8,000 | 80 | 60 | 15,680 | 11,693 | 42,093,274 | 61,849 |
| 9,000 | 80 | 60 | 17,640 | 13,154 | 47,354,933 | 69,580 |
| 10,000 | 80 | 60 | 19,600 | 14,616 | 52,616,592 | 77,311 |
| 11,000 | 80 | 60 | 21,560 | 16,077 | 57,878,251 | 85,042 |
| 12,000 | 80 | 60 | 23,520 | 17,539 | 63,139,910 | 92,774 |
| 13,000 | 80 | 60 | 25,480 | 19,000 | 68,401,570 | 100,505 |
| 14,000 | 80 | 60 | 27,440 | 20,462 | 73,663,229 | 108,236 |
| 15,000 | 80 | 60 | 29,400 | 21,924 | 78,924,888 | 115,967 |
| 10,000 | 15 | 60 | 3,675 | 2,740 | 9,865,611 | 14,496 |

As shown in the last row of Table 1, in some embodiments, a fracturing fluid may be able to create and hold open a fracture in a subterranean formation when pumped at an injection rate of 15 barrels per minute (bpm) and a BHTP of 10,000 pounds per square inch (psi), requiring only 3,675 HP of hydraulic horsepower to maintain the injection rate and initiate and extend a primary fracture into the formation. In order to create more complex fracture geometries using conventional fracturing treatments, the fracturing fluid would need to be injected at a higher rate or higher hydraulic horsepower. However, based on the calculated data shown in Table 1, placing and igniting 77,311 lbs of an ammonium nitrate-based electrically controlled propellant in the formation may provide an amount of energy equivalent to that provided in a conventional hydraulic fracturing treatment in which the fluid is injected at a rate of 80 bpm and a BHTP of 10,000 psi for 60 minutes.

The treatment fluids used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Moreover, in some embodiments, certain brine-based fluids may be exhibit certain electrical conductivity properties, which may facilitate ignition of the electrically controlled propellant once placed in the subterranean formation. Examples of non-aqueous fluids (liquids or gases) that may be suitable for use in the methods and systems of the present disclosure include, but are not limited to, oils, hydrocarbons (e.g., liquefied natural gas (LNG), compressed natural gas (CNG) methane, etc.), organic liquids, carbon dioxide, nitrogen, and the like. In certain embodiments, the fracturing fluids may comprise a mixture of one or more fluids and/or gases, including but not limited to emulsions, foams, and the like. In some embodiments of the present disclosure, the fracturing fluids and/or other treatment fluids used may be substantially "waterless" in that they do not comprise a significant amount of water (e.g., less than 5%, 1%, or 0.1% by volume), or alternatively, any amount of water.

In some embodiments, the viscosity of the treatment fluid(s) used during different portions of the methods of the present disclosure optionally may be varied, among other reasons, to provide different amounts of fluid loss control and/or leakoff that may be useful during those different steps. For example, in some embodiments, the fracturing fluid or pad fluid introduced at or above a pressure sufficient to create or enhance the primary fracture may be relatively viscous (e.g., about 250 cP or higher, up to about 5,000 cP), among other reasons, to minimize fluid leakoff and maintain a high bottomhole treating pressure in the formation. In some embodiments, the fluid comprising the electrically controlled propellant (either a fluid different from the fracturing fluid or a different stage of the same fracturing fluid) may have a relatively low viscosity (e.g., about 50 cP or lower, or 5 cP or lower), among other reasons, to facilitate leakoff and penetration of the propellant into bedding planes, microfractures, or other areas of the formation proximate to the primary fracture. In some embodiments, the fluid comprising the electrically controlled propellant may be followed by another relatively viscous fluid introduced into the formation, among other reasons, to displace the fluid comprising the propellant into the far well bore region of the formation with less loss or leakoff of that fluid. The higher viscosity of this fluid also may facilitate suspension of electrically conductive particulates and/or proppant particulates to be deposited in the near well bore portion of the primary fracture.

Any compatible, known viscosifying agents as well as any compatible, known crosslinking agents (e.g., metal carboxylate crosslinkers) capable of crosslinking the molecules of a polymeric viscosifying agent may be used in accordance with the methods of the present disclosure. In some embodiments, treatment fluids comprising liquid methane, liquefied natural gas, liquid gas hydrocarbon can be viscosified by admixing a quantity of a viscosifying agent comprising a copolymer of N,N-dimethylacrylamide and dimethylaminopropyl methacrylamide, an emulsion of an ethylene-propylene elastomer grafted with a dicarboxylic acid anhydride, a block copolymer of polystyrene and poly (ethylene oxide), with an aluminum carboxylate crosslinker selected from the group consisting of aluminum 2-ethylhexanoate, hydroxyaluminum bis(2-ethylhexanoate), and any combination thereof. In some embodiments, treatment fluids comprising liquid carbon dioxide or nitrogen can be viscosified with a viscosifying agent selected from the group consisting of: poly(methyl oxirane); polydimethylsiloxane (PDMS); poly(1-,1-,dihydroperfluorooctyl acrylate) (PFOA); fluoroacrylate monomers such as 1-,1-,2-,2-tetrahydro heptadecafluorodecylacrylate and styrene (fluoroacrylate-styrene) copolymer (polyFAST); fluorinated polyurethane disulfate; polyvinyl acetate (PVAc); poly [(1-O-(vinyloxy)ethyl1-2,3,4,6-tetra-O-acetyl-β-D-glucopyranoside)] (PAcGIcVE); 3-acetoxy oxetane; polyvinyl ethylether (PVEE); polyvinyl methoxy methyleether (PVMME); polymethyl acrylate (PMA); oligomers of cellulose triacetate (OCTA); per-acetylated cyclodextrin rings (PACD); benzoyl-vinyl acetate polymer (polyBOVA); semi-fluorinated troalkyltin fluoride; 12-hydroxystearic acid (HSA); and any combination thereof.

In certain embodiments, the treatment fluids used in the methods and systems of the present disclosure optionally may comprise any number of additional additives. Examples of such additional additives include, but are not limited to, salts, surfactants, acids, proppant particulates (e.g., frac sand), diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, crosslinking agents, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the electrically controlled propellant and/or other components of the treatment fluid may be metered directly into a base treatment fluid to form a treatment fluid. In certain embodiments, the base fluid may be mixed with the electrically controlled propellant and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

As noted above, an electrical current must be applied to the electrically controlled propellant to ignite it in the methods of the present disclosure. That electrical current may be transmitted or otherwise provided to the electrically controlled propellant in the formation using any means known in the art. In some embodiments, electrical current is provided from a direct current (DC) source, although electrical power from alternating current (AC) sources can be used as well. In some embodiments, the source of electrical current may be provided at the surface, and the current may be transferred via a conductive wire, cable, and/or tubing into the subterranean formation to the electrically controlled propellant and/or another electrically conductive material in contact with the propellant. In these embodiments, the electrical current may pass through any number of secondary relays, switches, conduits (e.g., wires or cables), electrodes, equipment made of conductive material (e.g., metal casings, liners, etc.) or other electrically conductive structures. In other embodiments, the electrical current also may be provided by some other downhole energy source (such as downhole charges, hydraulic power generators, batteries, or the like), and then applied to the electrically controlled propellant in the formation. In certain embodiments, the amount of electrical current applied to ignite the electrically controlled propellant may range from about 1 milliamp to about 100 milliamps. In certain embodiments, the electrical current applied to ignite the electrically controlled propellant may have a corresponding voltage of from about 100V to about 600V.

The electrically controlled propellant may be ignited at any time, and the application of electrical current to the propellant may be triggered in any known way. In some embodiments, the current may be applied in response to manual input by an operator, either at the surface of the well site or from a remote location. In other embodiments, the current may be applied automatically in response to the detection of certain conditions in the formation using one or more downhole sensors. Examples of downhole sensors that may be used in this way include, but are not limited to, pressure sensors, temperature sensors, water sensors, motion sensors, chemical sensors, and the like.

As discussed above, particles of electrically conductive materials optionally may be placed in various regions of the formation, among other reasons, to help transmit electrical current to facilitate ignition and removal of the electrically controlled propellant when the current is applied, even in far-field regions of a subterranean formation. For example, in some embodiments, electrically conductive particles may be mixed in the same fluid with the electrically controlled propellants, among other reason, to facilitate placement of those particles proximate to and/or in contact with the propellants. In certain embodiments, the electrically conductive materials may comprise micro- and/or nano-sized particles. Examples of electrically conductive materials that may be suitable in certain embodiments of the present disclosure include but are not limited to metal powders, metal shavings, steel shot, graphite, calcined coke, metal coated particles, particles coated with electrically conductive polymer, and any combinations thereof. Examples of conductive metals that may be suitable for use in certain embodiments of the present disclosure include, but are not limited to, graphite, silver, gold, calcium lithium, platinum, titanium, nickel, copper, iron, silver, zinc, brass, tin, aluminum, steel, lead, magnesium, and any alloy or combination thereof. In some embodiments, the electrically conductive material may comprise an electrically conductive polymer material, such as at least one of a polypyrrole, polyfuran, polythiophene, polyaniline, as well as any copolymers, combinations, and/or derivatives thereof.

In some embodiments, the electrical current may be applied to the electrically controlled propellant substantially continuously until substantially all of the propellant has been ignited or the desired fracture geometries have been created in the formation. In other embodiments, the electrical current may be applied to the electrically controlled propellant intermittently. The intermittent ignition of the propellant may generate a series of shorter pulses of energy and/or pressure in the area of the formation proximate to the primary fracture. The cracks and fractures in the formation may be permitted to relax or constrict between these intermittent pulses, which may facilitate the creation of more complex fracture geometries.

Figure 3:
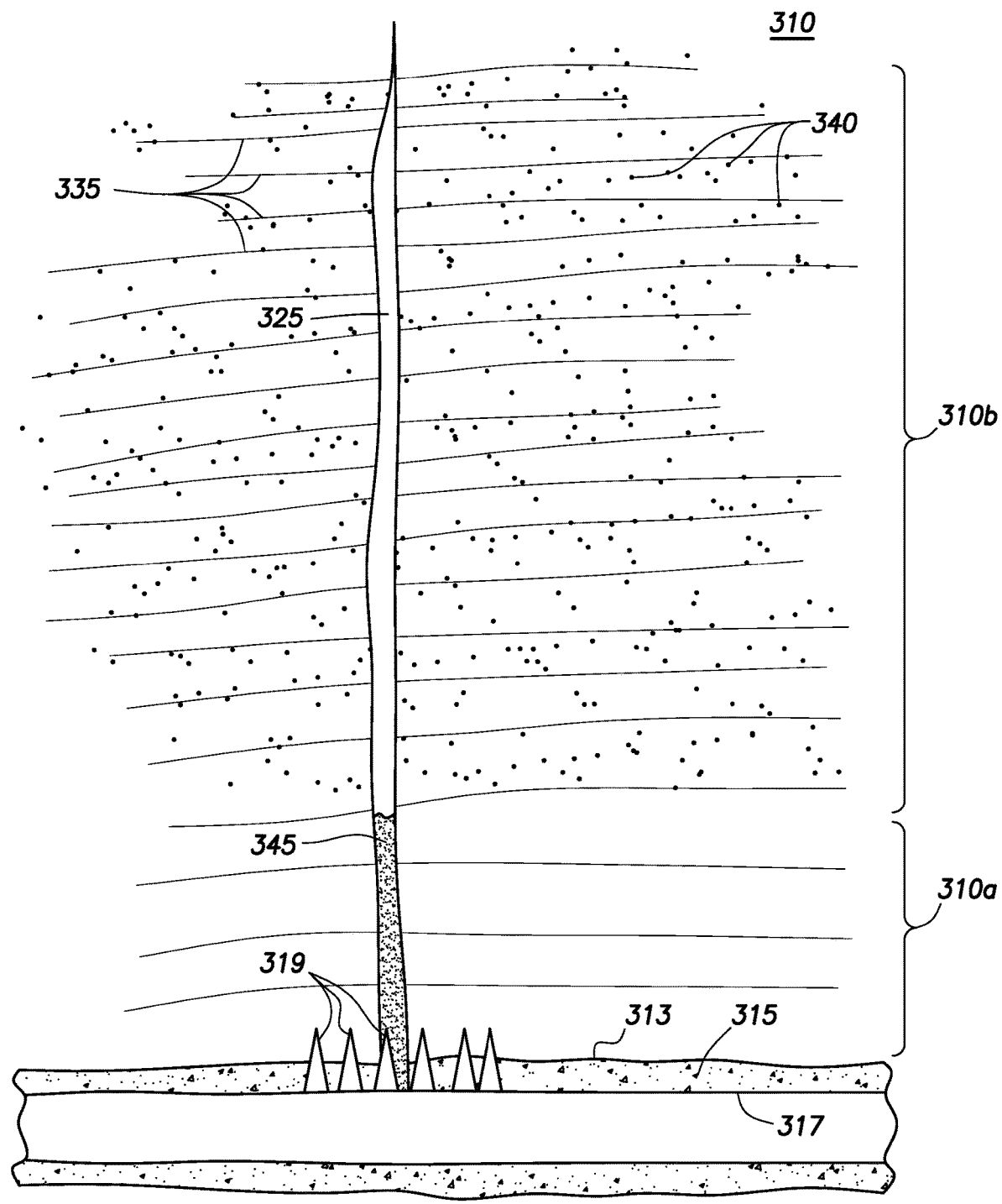
FIG. 3 is a diagram illustrating a portion of a subterranean formation during a treatment in accordance with certain embodiments of the present disclosure.
Figure 4:
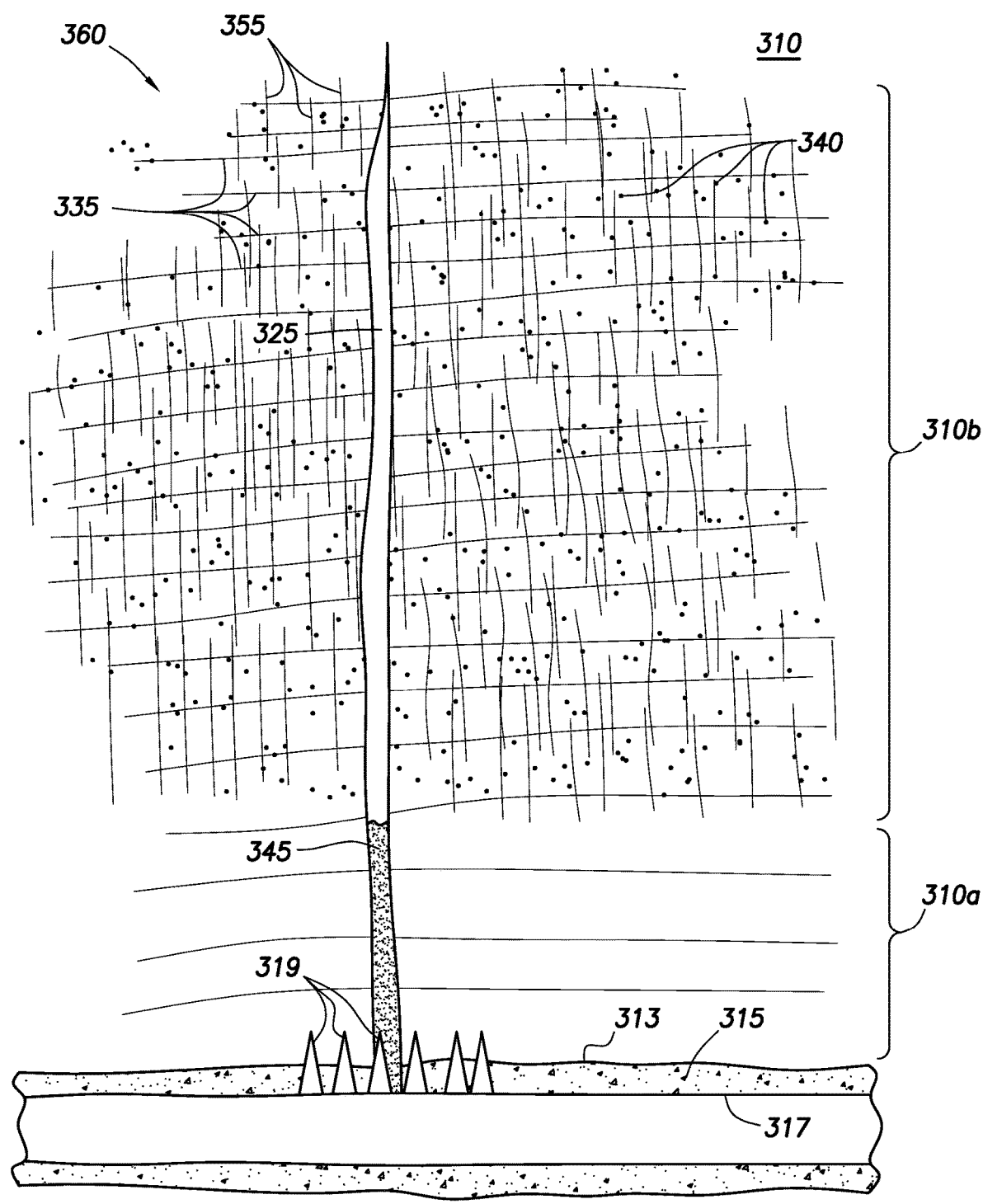
FIG. 4 is a diagram illustrating the portion of a subterranean formation from FIG. 3 after the ignition of electrically controlled propellant therein in accordance with certain embodiments of the present disclosure.

An example of a fracture network created and/or enhanced according to the methods of the present disclosure is illustrated in FIGS. 3 and 4. Referring now to FIG. 3, a well bore 313 is shown penetrating a portion of a subterranean formation 310. Relative to the location of the well bore 313, the subterranean formation 310 may comprise a near well bore region 310a and a far well bore region 310b. The distances from the well bore 313 at which these regions are delineated are not shown to scale in FIGS. 3 and 4, and may vary depending on the application of the present disclosure, but would be recognized by a person of skill in the art with the benefit of this disclosure. In some embodiments, the region within about 10 meters (about 33 feet) of the well bore may be considered the near well bore region 310a, and the region more than about 10 meters beyond the well bore may be considered the far well bore region 310b. A casing string 317 is disposed within the well bore 313 and is held in place by cement 315 placed in an annular area between the well bore 313 and the outer surface of the casing 317. In order to allow fluid flow between the formation 310 and the inside of the casing 317 and well bore 313, perforations 319 may be created through the casing 313 and cement 317 in selected locations. The portion of the well bore 313 shown in FIGS. 3 and 4 is oriented horizontally, although a person of skill in the art with the benefit of this disclosure will recognize that the methods of the present disclosure could be similarly applied to sections of a well bore that are vertical or deviated from vertical to a lesser degree. Also, the methods of the present disclosure may be applied to open holes which may lack casing strings, cement, and or perforations shown in FIGS. 3 and 4.

A primary fracture 325 extends from the well bore 313 to penetrate both the near well bore region 310a and the far well bore region 310b of the subterranean formation 310. The primary fracture 325 may have been created by introducing a fracturing fluid (e.g., a fracturing fluid of the present disclosure, or a conventional fracturing fluid) into the subterranean formation at or above a pressure sufficient to create or enlarge the fracture 325. In some embodiments, the portion of the well bore 313 adjacent to the fracture 325 may have been isolated (e.g., using packers, plugs, or other isolation tools) before the fracturing fluid was introduced. The primary fracture 325 also penetrates a number of bedding planes 335 of the formation 310. Electrically controlled propellant 340 has been placed in the bedding planes 335 in at least the far well bore region 310b via the primary fracture 325. In some embodiments, electrically controlled propellant may not be placed in bedding planes in the near well bore region 310a, among other reasons, to prevent damage to that region and/or the well bore. A plurality of proppant particulates 345 also have been placed in the near well bore portion of the primary fracture 325, among other reasons, to maintain the conductivity of the primary fracture and to protect the well bore. Thus, FIG. 3 shows the portion of the formation 310 prior to ignition of the electrically controlled propellant according to the methods of the present disclosure.

Referring now to FIG. 4, the same formation 310 as shown in FIG. 3 is shown after ignition of at least a portion of the electrically controlled propellant 340 in the bedding planes 335. The ignition of the propellant has ruptured the rock in the far well bore region 310b to form secondary fractures 355 therein. As shown, the near well bore region 310a remains substantially undisrupted because electrically controlled propellant was not placed or ignited in bedding planes in the near well bore region 310a. The combination of the secondary fractures 355, bedding planes 335, and primary fracture 325 form a conductive fracture network 360 through which fluids such as oil, gas, and/or water may flow from the formation 310 into the well bore 313 for production.

Although not shown, the aforementioned features of the portion of the subterranean formation 310 and fracture network 350 shown above the well bore 313 also may exist and/or be created below the well bore 313 (e.g., as in a "bi-wing" fracture configuration, similar to that illustrated as fracture 116 in FIG. 2) in the methods of the present disclosure.

In some embodiments, the ignition of the electrically controlled propellant may, in addition to the formation of secondary or tertiary fractures, rupture the nearby rock formation to form rock particulates in the secondary or tertiary fractures. In some embodiments, these rock particulates may act as an in-situ proppant material to prop open the secondary or tertiary fractures and maintain their conductivity after the fracturing treatment is completed. In some embodiments, a treatment fluid comprising a consolidating agent such as a curable resin optionally may be introduced into the primary fracture and allowed to penetrate the secondary and/or tertiary fractures created by the combustion of the electrically controlled propellant. The consolidating agent may, among other benefits, treat the fracture faces in the primary, secondary, or tertiary fractures in the formation, and lock in place any formation fines and/or loose rock particulates (e.g., rock particulates generated when the electrically controlled propellant was ignited). Any consolidating agent known in the art, including resins, tackifiers, and the like, may be used in accordance with the methods of the present disclosure. In some embodiments, preflush and/or afterflush fluids may be introduced into the formation before and/or after the consolidating agent is introduced, among other reasons, to prepare the rock surfaces for treatment and/or to displace excess consolidating agent from pore spaces in the formation.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that may provide electrically controlled propellant and/or one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
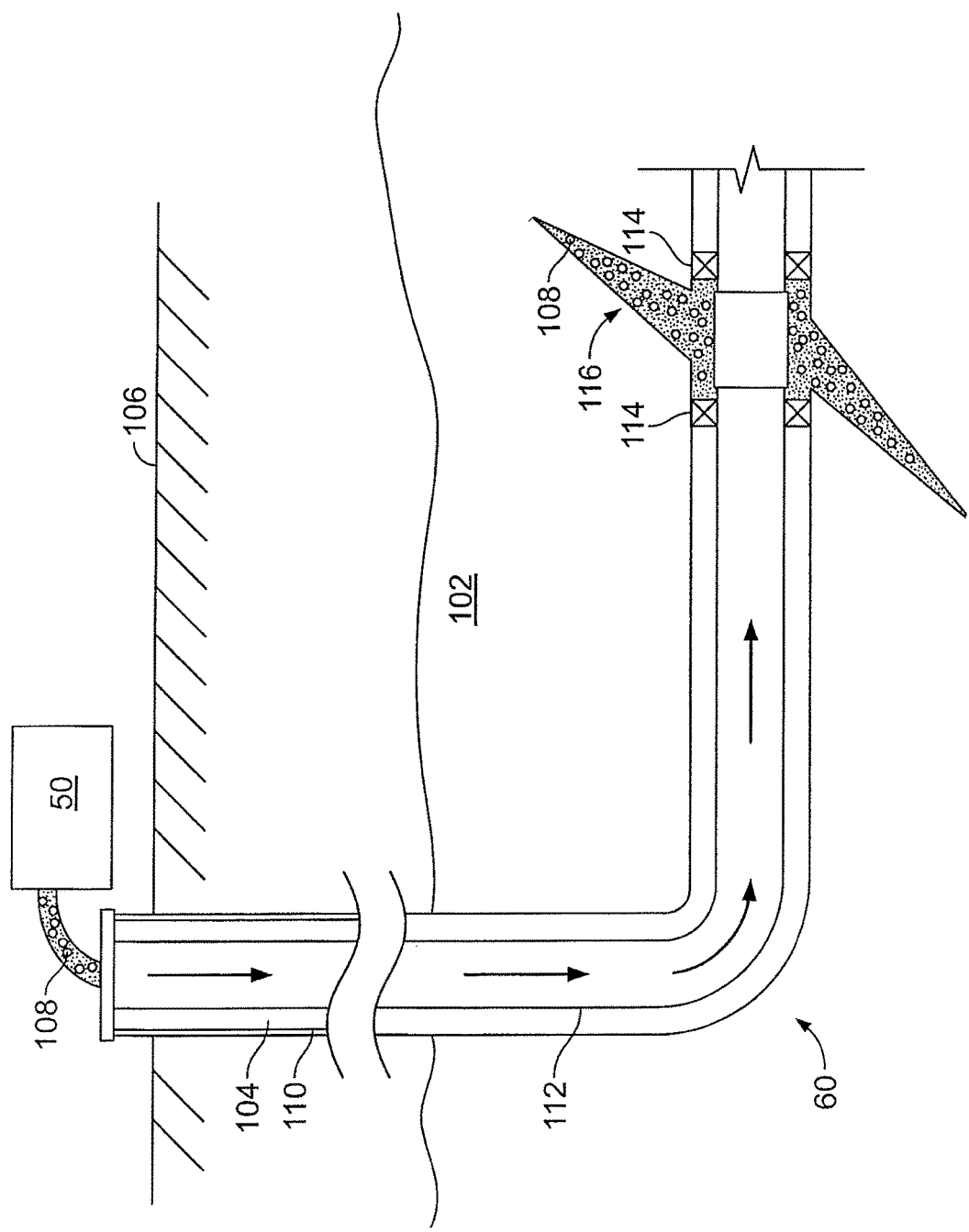
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools. The portion of the well bore 104 proximate to the portion of the subterranean formation 102 to be fractured also may be isolated using any known method of zonal isolation, including but not limited to packers, plugs, gels, valves, and the like.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: introducing a fracturing fluid into at least a portion of a subterranean formation at or above a pressure sufficient to create or enhance at least one primary fracture in the subterranean formation; introducing an electrically controlled propellant and a plurality of electrically conductive particles into the primary fracture; placing the electrically controlled propellant and the plurality of electrically conductive particles in one or more areas of the subterranean formation proximate to the primary fracture; and applying an electrical current to at least a portion of the electrically controlled propellant to ignite the portion of the electrically controlled propellant in the one or more areas of the subterranean formation proximate to the primary fracture to form one or more secondary or tertiary fractures in the subterranean formation.

Another embodiment of the present disclosure is a method comprising: introducing a treatment fluid comprising an electrically controlled propellant and a plurality of electrically conductive particles in at least one primary fracture in a portion of a subterranean formation; placing the plurality of electrically conductive particles in at least the primary fracture; placing the electrically controlled propellant in one or more areas of the subterranean formation proximate to the primary fracture; and applying an electrical current to at least a portion of the electrically controlled propellant to ignite the portion of the electrically controlled propellant in the one or more areas of the subterranean formation proximate to the primary fracture to form one or more secondary or tertiary fractures in the subterranean formation.

Another embodiment of the present disclosure is a fracture network in a subterranean formation comprising: a well bore penetrating at least a portion of the subterranean formation; a primary fracture in the subterranean formation in fluid communication with the well bore, wherein a plurality of electrically conductive particles are located within the primary fracture, and a plurality of proppant particulates are located within a portion of the primary fracture in a near well bore area of the subterranean formation; and one or more secondary or tertiary fractures in the subterranean formation in fluid communication with the primary fracture formed at least in part by ignition of an electrically controlled propellant in a far well bore area of the subterranean formation proximate to the primary fracture.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a fracturing fluid into at least a portion of a subterranean formation at or above a pressure sufficient to create or enhance at least one primary fracture in the subterranean formation;
   introducing an electrically controlled propellant and a plurality of electrically conductive particles into the primary fracture;
   placing the electrically controlled propellant and the plurality of electrically conductive particles in one or more areas of the subterranean formation proximate to the primary fracture; and
   applying an electrical current to at least a portion of the electrically controlled propellant to ignite the portion of the electrically controlled propellant in the one or more areas of the subterranean formation proximate to the primary fracture to form one or more secondary or tertiary fractures in the subterranean formation, wherein the electrically controlled propellant is ignited by transferring the electrical current to the electrically controlled propellant through at least one of a conductive wire, a conductive cable, or a conductive tubing.

2. The method of claim 1 wherein the fracturing fluid comprises less than 5% by volume of water.

3. The method of claim 1 wherein the fracturing fluid comprises less than 5% by volume of solids.

4. The method of claim 1 wherein the fracturing fluid comprises the electrically controlled propellant and the plurality of electrically conductive particles.

5. The method of claim 1 wherein:
   introducing the electrically controlled propellant and the plurality of electrically conductive particles into the primary fracture comprises introducing a treatment fluid comprising the electrically controlled propellant and the plurality of electrically conductive particles into the primary fracture; wherein the treatment fluid has a viscosity that is less than a viscosity of the fracturing fluid.

6. The method of claim 1 wherein the electrically controlled propellant comprises a liquid electrically controlled propellant.

7. The method of claim 1 wherein the electrical current is applied in an amount of from about 1 milliamp to about 100 milliamps.

8. The method of claim 1 wherein applying the electrical current to at least a portion of the electrically controlled propellant comprises applying the electrical current to at least a portion of a casing in a well bore penetrating at least the first portion of the subterranean formation.

9. The method of claim 1 wherein the electrically controlled propellant comprises:
   a binder selected from the group consisting of: polyvinyl alcohol, polyvinylamine nitrate, polyethanolaminobutyne nitrate, polyethyleneimine nitrate, any copolymer thereof, and any mixture thereof;
   an oxidizer selected from the group consisting of: ammonium nitrate, hydroxylamine nitrate, and any mixture thereof; and
   a crosslinking agent.

10. The method of claim 1 further comprising introducing a plurality of proppant particulates and a second plurality of electrically conductive particles into a portion of the primary fracture in a near well bore area of the subterranean formation.

11. The method of claim 1 wherein the one or more areas of the subterranean formation proximate to the primary fracture comprises a far well bore area of the subterranean formation.

12. A method comprising:
    introducing a treatment fluid comprising an electrically controlled propellant and a plurality of electrically conductive particles in at least one primary fracture in a portion of a subterranean formation;
    placing the plurality of electrically conductive particles in at least the primary fracture;
    placing the electrically controlled propellant in one or more areas of the subterranean formation proximate to the primary fracture; and
    applying an electrical current to at least a portion of the electrically controlled propellant to ignite the portion of the electrically controlled propellant in the one or more areas of the subterranean formation proximate to the primary fracture to form one or more secondary or tertiary fractures in the subterranean formation, wherein the electrically controlled propellant is ignited by transferring the electrical current to the electrically controlled propellant through at least one of a conductive wire, a conductive cable, or a conductive tubing.

13. The method of claim 12 wherein the treatment fluid comprises less than 5% by volume of water.

14. The method of claim 12 wherein the electrically controlled propellant comprises a liquid electrically controlled propellant.

15. The method of claim 12 wherein the electrically controlled propellant comprises:
    a binder selected from the group consisting of: polyvinyl alcohol, polyvinylamine nitrate, polyethanolaminobutyne nitrate, polyethyleneimine nitrate, any copolymer thereof, and any mixture thereof;
    an oxidizer selected from the group consisting of: ammonium nitrate, hydroxylamine nitrate, and any mixture thereof; and
    a crosslinking agent.

16. The method of claim 12 wherein the one or more areas of the subterranean formation proximate to the primary fracture comprises a far well bore area of the subterranean formation.

17. The method of claim 12 wherein the treatment fluid has a viscosity of about 50 cP or less.

18. The method of claim 12 further comprising introducing a plurality of proppant particulates and a second plurality of electrically conductive particles into a portion of the primary fracture in a near well bore area of the subterranean formation.

19. A fracture network in a subterranean formation comprising:
    a well bore penetrating at least a portion of the subterranean formation;
    a primary fracture in the subterranean formation in fluid communication with the well bore, wherein
    a plurality of electrically conductive particles are located within the primary fracture, and
    a plurality of proppant particulates are located within a portion of the primary fracture in a near well bore area of the subterranean formation; and
    one or more secondary or tertiary fractures in the subterranean formation in fluid communication with the primary fracture formed at least in part by ignition of an electrically controlled propellant in a far well bore area of the subterranean formation proximate to the primary fracture, wherein the electrically controlled propellant is ignited by transferring an electrical current to the electrically controlled propellant through at least one of a conductive wire, a conductive cable, or a conductive tubing.

20. The fracture network of claim 19 wherein the electrically controlled propellant comprises a liquid electrically controlled propellant.

\* \* \* \* \*